Dec. 24, 1968 G. H. FREIER 3,417,999

PHONOGRAPH TONE ARM

Filed Jan. 26, 1967 3 Sheets-Sheet 1

INVENTOR
GERALD H. FREIER
BY Brown, Jackson, Boettcher & Dienner
ATTORNEYS

INVENTOR
GERALD H. FREIER
BY Brown, Jackson, Boettcher & Dienner
ATTORNEYS

INVENTOR
GERALD H. FREIER
BY Brown, Jackson, Boettcher & Dienner
ATTORNEYS

United States Patent Office 3,417,999

Patented Dec. 24, 1968

3,417,999

PHONOGRAPH TONE ARM

Gerald H. Freier, Berrien, Mich., assignor to V-M Corporation, Benton Harbor, Mich., a corporation of Michigan Filed Jan. 26, 1967, Ser. No. 611,886
20 Claims. (Cl. 274—23)

ABSTRACT OF THE DISCLOSURE

Record player in which the tone arm is suspended from a horizontally swinging mount by two coils of wire wound such that their axial bending moment is equivalent to a single strand of smaller wire, the two wire coils defining a horizontal axis about which the tone arm swings vertically, the tone arm having a slidable counterweight for balancing, and a tension spring anchored at one end to the tone arm behind said horizontal axis and anchored at its other end to the mount in front of said horizontal axis, the geometry of the tension spring anchor position being selected such that the tension spring produces a substantially constant stylus force at different record heights, the anchor of the spring end to the mount being also vertically adjustable to change the stylus pressure.

This invention relates to phonograph tone arms and particularly to a novel and improved mounting therefor which will accommodate vertical movement of the tone arm in a manner to obtain good fidelity in sound reproduction and to reduce wear on records and on the tone arm stylus.

A principal object of the invention is to provide a novel and improved mount for a tone arm which will accommodate pivoting of the tone arm about a horizontal axis so as to adjust to the variable record height on the phonograph turntable during record play and which pivoting being through a vertical plane is in addition to the conventional pivoting of the tone arm about a vertical axis which permits the tone arm stylus to track in the record groove.

Another object of the invention is to provide a flexible support for a tone arm which allows said pivoting of the tone arm about a horizontal axis while affording little frictional resistance thereto.

Another object of the invention is to provide a tone arm construction wherein the tone arm is suspended by flexible pivot means having an axial bending moment such that a load, as for example stylus pressure on a record, is distributed over a length thereof so as to reduce the possibility of fatigue fracturing.

Still another object of the invention is to provide a construction of tone arm mounting which permits a substantially constant and predetermined stylus pressure on the record being played whether the groove of the record being tracked by the tone arm stylus is the only record on the turntable or is the top one of several records on the turntable.

A further object of the invention is to provide such a construction of tone arm mounting which also permits convenient and ready adjustment of the stylus pressure on the record.

In the accomplishment of the aforesaid and other objects, the invention provides that the tone arm is suspended on a horizontally pivoting mount by means of a pair of spaced vertical coil sections which are arranged to permit a pivoting of the tone arm about intermediate portions thereof which define an axis located below the tone arm and intersecting the pivotal axis of the mount behind the stylus bearing end of the tone arm. The tone arm is balanceable by means of an adjustable weight located on the tone arm behind said pivotal axis. In addition a tension spring is anchored between a pair of points, one in front of and the other behind said pivotal axis of the tone arm. One point being on the tone arm and the other on its mount and so arranged that the spring has its longitudinal axis substantially intersecting both said pivotal axes of the tone arm and its mount at right angles thereto, and is also horizontally disposed when the tone arm is in balance. One of said anchor points is also vertically adjustable, as for example after the tone arm is in balance so as to permit introducing a predictable stylus pressure on the record and which will be substantially of the same force whether the record is the first or last of the stack of records deposited on the turntable.

Thus an important feature of the invention is that the tone arm is supported for its vertical movement by means of coiled wire sections which are so wound that their axial bending moment is equivalent to that of single wires of much smaller gauge. This means that it is possible to use heavier gauge wire to suspend the tone arm with its greater resistance to fatigue fracturing while providing the required free flexing which affords only minimal frictional resistance to pivoting of the tone arm and so contributes to improving fidelity in sound reproduction by the stylus tracking in the groove of the rotating record.

Another feature of the invention is the geometric relationship of the tension spring and pivotal support of the tone arm such that as the tone arm moves vertically about its pivot as to locate its stylus at different record heights on the turntable, the one anchor point of the tension spring on the tone arm so changes position that its distance from the horizontal axis on which the tone arm moves vertically increases in a ratio such that the new torque generated compensates for both the change in resisting torque of the pivot members and also the change in length of the tension spring generating the torque wherefore within limits corresponding to the average range of height of records stacked on a phonograph turntable the stylus pressure remains substantially constant.

Yet another feature of the invention is that the pivotal axis about which the tone arm moves vertically is located at the average or half a full load of records on the turntable.

Another feature of the invention is the novel means employed for adjustably supporting the counterweight on the rear end of the tone arm and behind its pivotal support on its mount.

A further feature is the novel construction of the counterweight itself which is such that its center of gravity is also located low and advantageously below a horizontal plane which includes the horizontal pivot axis by which the tone arm moves vertically.

A further feature of the invention is the adaptation of the fixed anchor point of the tension spring or that end thereof which does not change its position in pivoting of the tone arm so that it may be moved vertically but in a straight line parallel to the axis on which the tone arm mount turns, said movement being by controllable increments in order to introduce a change in the pressure of the stylus exerted on a record in playing but while retaining the feature that said pressure also remains essentially constant for a range of record heights.

A still further object of the invention is the provision of a tone arm support or mounting by which all of the aforesaid objects, advantages and features are obtained in a construction which is particularly realiable in its operation, durable in its assembly and one that is also of simple structure and inexpensive to manufacture.

Other and further objects, features and advantages of the invention will be at once apparent or will become so from a consideration of the following description of an illustrated embodiment thereof given for the purpose of disclosure and taken in conjunction with the accompanying drawings in which like character references designate like parts throughout the several views.

Referring therefore to the drawings.

Figures 7, 8:
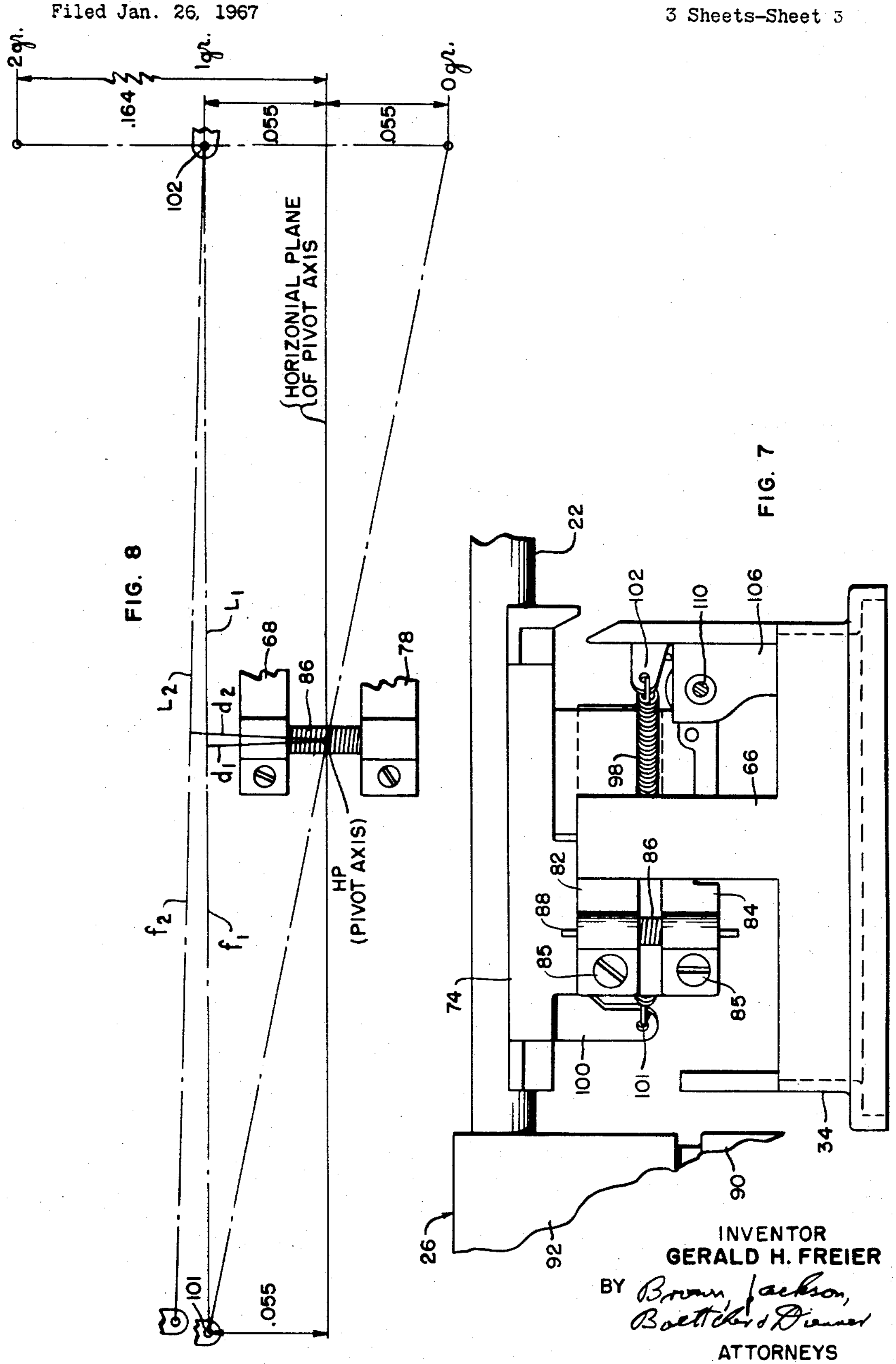

FIGURE 7 is a side elevational view taken of the tone arm mount with the near half of the housing cover removed; and FIGURE 8 is a substantially enlarged schematic view which illustrates various positions of the stylus pressure control spring having one end adjustably positioned for a given predetermined stylus pressure and its other end anchored to the tone arm, such spring positions varying in accordance with the number of records on the turntable.

Figure 1:
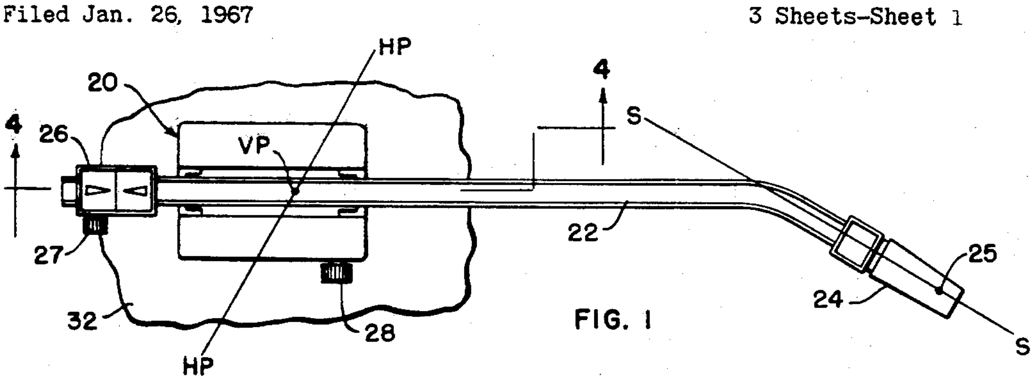
FIGURE 1 is a top plan view of a phonograph tone arm constructed in accordance with the present invention.
Figure 2:
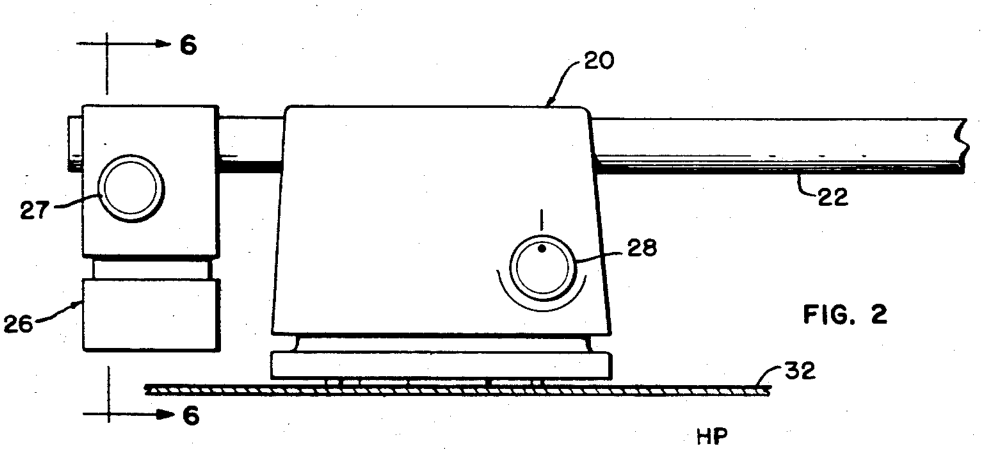
FIGURE 2 is a fragmented side elevational view of said tone arm and shows the adjustable knob used for manually selecting a desired stylus pressure and also the adjustable counterweight for initially balancing the tone arm.

Referring now more specifically to the several views which illustrate the invention and first to FIGURES 1 and 2, the invention is shown embodied in a tone arm assembly comprising a tone arm mount indicated generally at 20 and a tone arm 22 supported on said mount 20 as afterwards described and having a cartridge 24 fixedly mounted at its forward end, said cartridge carrying a stylus 25. On the rear end of said tone arm 22 is supported a counterweight 26 adapted for movement longitudinally of the tone arm. At 27 is a control knob which may be rotated to move the counterweight 26 along the tone arm and at 28 is a rotatable knob which operatively connects to adjusting means for selecting a desired stylus pressure.

Figure 4:
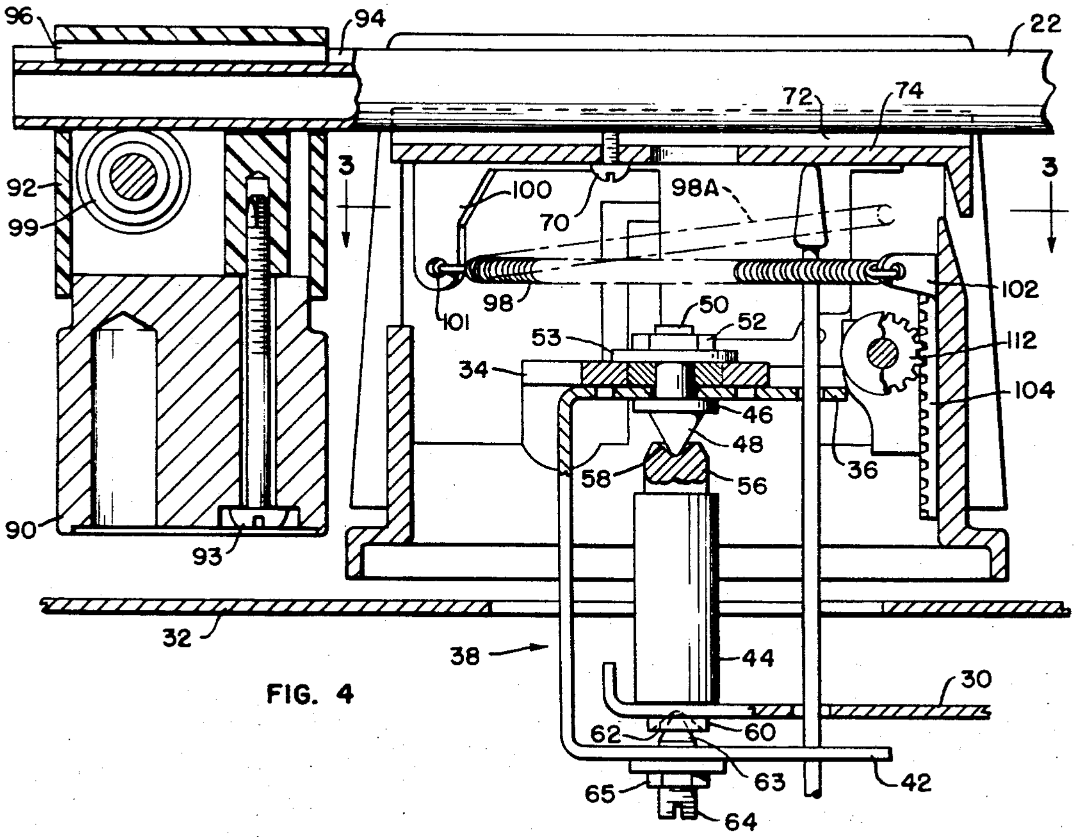
FIGURE 4 is an enlarged vertical sectional view taken along line 4—4 of FIGURE 1 looking in the direction indicated by the arrows.

Referring now to FIGURE 4, the tone arm assembly is shown mounted on a sub-plate 30 of a conventional record player changer or phonograph which is provided with a rotatable turntable (not shown) onto which one record or more than one record is successively dropped or lowered for individual playing by stylus 25 tracking in the groove of the top record as it is rotated with the turntable in well known manner. Also, as is conventional, sub-plate 30 is suspended by springs or other means from base plate 32 over which the tone arm assembly and also the turntable are conventionally disposed.

Figure 3:
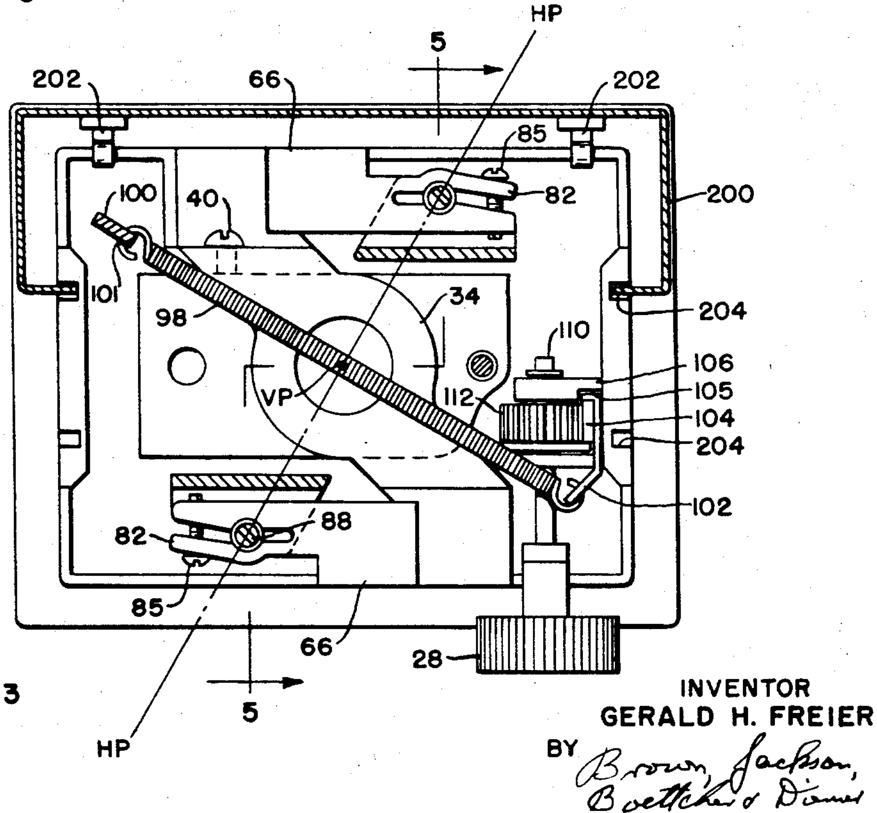
FIGURE 3 is a horizontal sectional view taken substantially along lines 3—3 of FIGURE 4 looking in the direction indicated by the arrows to show relation of parts of the tone arm mounting.

In order that stylus 25 can track in the groove of the top record with rotation of the turntable, the tone arm assembly must be free to pivot about a vertical axis; that is to say it must be able to move through a plane generally parallel to the plane of the turntable and/or record(s) supported thereon. Although any suitable means may be provided in accordance with the present invention for accomplishing said horizontal swinging or pivoting of the tone arm, in the illustrated embodiment tone arm mount 20 is illustrated as having a base plate 34 which seats on the upper horizontal arm 36 of a generally C-shaped yoke member 38 and is securely attached thereto as by fastening means in the form of screw 40 (FIG. 3). Disposed between upper horizontal arm 36 and lower horizontal arm 42 of said yoke member 38 is a bearing post 44 appropriately staked by suitable means to sub-plate 30. Bearing post 44 has an upper end portion 56 provided with an upper conical recess 58 and also has a lower end portion 60 extending through a provided opening in sub-plate 30 and having a lower conical recess

62, the two conical recesses 58 and 62 being in coaxial vertical alignment. At 46 is a pivot stud having a conical lower end 48 which seats in upper conical recess 58 and an upstanding portion 50 which extends through aligned openings in horizontal arm portion 36 of yoke 38 and base plate 34 of the tone arm mount 20 and is securely fastened thereto as by means of C-washer 52 and pressure washer 53. Secured to the lower horizontal arm 42 of yoke 38 as by threaded engagement in boss 65 is a pivot screw 64 having a conical end 63 seated in the lower conical recess 62. Pivot screw 64 is preferably threaded upwardly into boss 65 only sufficiently far as to cause its end 63 to have engagement in lower conical recess 62 of the bearing post whereby to complete the assembly and allow yoke 38 and tone arm mount 20 secured thereto to freely rotate on vertical axis VP—VP which the engagement of said conical ends 48 and 63 in conical recesses 58 and 62 of bearing post 44 provide. Tone arm 22 being supported on the tone arm mount 20 as afterwards described, is therefore free to move inwardly of the record toward the center of the rotating turntable as its stylus 25 tracks in the groove of the record being played. By reason of the described pivotal support of the tone arm mount 20 frictional resistance to said inward movement of the stylus in tracking the record groove is reduced substantially to a minimum.

Figure 5:
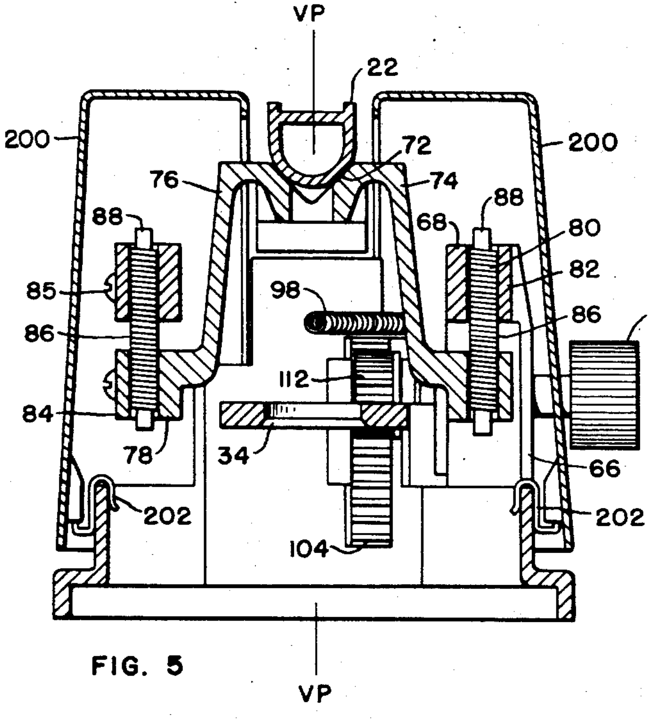
FIGURE 5 is a vertical sectional view taken substantially along line 5—5 of FIGURE 3.

The tone arm must also be free to move vertically in order to permit raising the stylus off the record at the end of record play and also to lower the stylus into the record groove at the start of play. For this purpose, as illustrated in FIGURES 4, 5 and 7, tone arm 22 is supported on the tone arm mount 20 by a pair of flexible or resilient members 80 having an intermediate section 86 which being axially deflectable define a horizontal pivotal axis HP—HP which intersects said vertical axis VP—VP and about which the tone arm is movable vertically. As shown by said FIGURES 4, 5, and 7, rising from base plate 34 of the tone arm mount 20 are a pair of spaced uprights 66 equidistantly spaced on opposite sides of the tone arm and each having a hanger extension 68 disposed generally parallel to each other and to the portion of the tone arm 20 positioned therebetween. The tone arm 22, itself, has a portion thereof remote from its forward end supporting cartridge 24 seated within longitudinally extending seat 72 of a cradle 74 and secured thereto as by screw 70, said seat 72 being of substantial length so as to provide a stable support for the tone arm 22 seated therein. Cradle 74 has forwardly and rearwardly disposed laterally spaced depending arms 76 which are located inwardly of said hanger extension 68 and terminate in outwardly offset portions 78 each of which are located immediately below a respective one of said hanger extensions 68. Each thus said aligned hanger extension 68 and offset portion 78 have a vertically extending semi-cylindrical recess in the outer face thereof in which are received respective upper and lower portions of a pair of coiled wires or springs 80. Cooperatively associated with each said hanger extension 68 and offset portion 78 are clamps 82 and 84 which have similarly located and disposed semi-cylindrical shaped recesses which align with the respective upper and lower portions of the coil wire suspension member 80, said clamp members 82 and 84 being respectively secured to the hanger extension 68 and projection 78 as by screws 85 so as to clampingly secure the respective upper and lower sections of coil spring 80 therebetween. By such means the tone arm 22 and more accurately its cradle 74 is suspended on the hangers 68 of the tone arm mount 20. The hanger extensions 68 and projections 78 as seen in FIG. 5 are slightly spaced so as to leave a short intermediate section 86 of said coiled wires 80 in an unconfined state wherefore they are free to deflect axially but only in a confined direction wherefore they define the aforementioned horizontal pivotal axis HP—HP about which the tone arm 22 and its stylus 25 is free to move vertically (said axis HP—HP being the effect of the bending moment of the sections 86 between the clamped upper and lower end sections of the coiled wire members 80 and considered as effecting a pivot midway of the free height of sections 86).

Referring now to FIGURES 1 and 3, it will be seen that with proper balancing of the tone arm 22 the wire coils 80 are disposed vertically by reason of the aligned relationship that exists between hanger extensions 68 and laterally offset portions 76 of the tone arm cradle 74. Furthermore, axis HP—HP defined thereby is at right angles with respect to the longitudinal axis *s—s* of the cartridge 24. Thus, it is contemplated that the tone arm may be given a bend sufficient to provide clearance for a record with only minimum swinging thereof about axis VP—VP. At the same time the stylus cartridge 24 is properly located for vertical movement of the stylus.

Moreover by utilizing sections of coiled wire to suspend the tone arm as described, it is possible to utilize a much larger gauge of wire and still obtain an axial bending moment equivalent to that which is present if two single strands of smaller gauge wire were used as the suspension members. Of consequence, because the bending load can be distributed over a greater length of larger diametered wire, fatigue fracturing is reduced. At the same time, the assembly being less delicate, a generally stronger pivoting system is obtained and one which is more easily handled. Thus, for example, .020 inch diametered music wire may be coiled to have an outside diameter of approximately .125 inch and when freely wound to have a gap of from .002 to .005 inch between loops will have an axial deflectivity equal to a single strand of .010 inch music wire. In accordance with the invention to further dampen the axial deflectivity of said intermediate section 86 of the two coiled wires 80 a length of flexible plastic such as polyethylene having a cross section approximating that of the inner diameter of the coil may be extended through the coil, the same being illustrated at 88.

Figure 6:
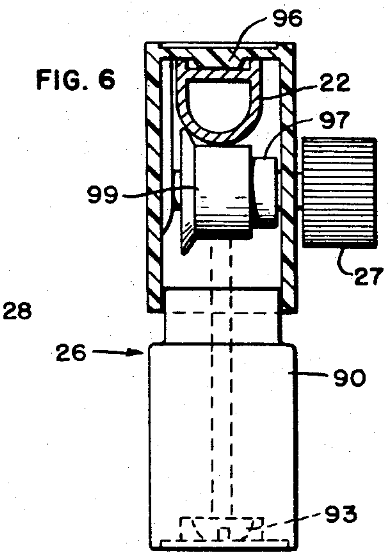
FIGURE 6 is a vertical sectional view taken substantially along the line 6—6 of FIGURE 2.

In accordance with the invention, balancing means in the form of a counterweight 26 is adjustably mounted on the rear end of the tone arm 22 in order to compensate for the weight of the tone arm and cartridge 24 extending forwardly of said horizontal axis HP—HP. Referring therefore to FIGURES 4 and 6, counterweight 26 is illustrated as comprising two members 90 and 92 detachably joined as by screw 93. Member 92 comprises a guide element and for which purpose is essentially hollow and has front and rear aligned openings 94 corresponding in outline to the cross sectional shape of the tone arm 22. Thus referring to FIGURE 6 it will be noted that the tone arm in cross section has a rounded bottom, upwardly extending parallel sides and an essentially planar top wall which is depressed slightly below the upper extremities of the two sides. Aligned openings 94 in guide member 92 of the counterweight are similarly shaped. Portion 96 of the periphery of said openings protruding into the space between the terminations of the two sides of the tone arm provide a guide which resists turning of the counterweight about the longitudinal axis of the tone arm. In addition, the guide member 92 is provided with a wheel 99 fixedly supported on a shaft 97 which is rotatably mounted in opposed walls of guide member 90. Wheel 99 is constructed of rubber or other friction inducing material and has its outer periphery in engagement with the underside of the portion of the tone arm extending through the counterweight. As shown in FIGURE 6, previously mentioned knob 27 is suitably secured to the outward extending end of shaft 97 wherefore by appropriate rotation of knob 27 wheel 99 can be caused to drive the counterweight longitudinally of the tone arm either toward or away from horizontal pivotal axis HP—HP in accordance with the direction in which knob 27 is rotated and so as to achieve a desired balancing of the tone arm.

In order to keep the center of gravity of the counterweight low, said guide portion 92 is constructed of a light weight material, for example a suitable plastic, whereas member 90 is a dense block of much heavier metal appropriately dimensioned to provide the weight required. As shown in FIGURE 4, weighted member 90 is so spaced from the tone arm extending through aligned openings 94 in guide member 92 that the center of gravity of the counterweight is located well below a horizontal plane which includes the mentioned horizontal pivotal axis HP—HP about which the tone arm is free to swing vertically. By such arrangement, which approximates a beam balance, the amount of torque which the counterweight introduces into the coiled wired sections 80 on which the tone arm is suspended and particularly the unconfined intermediate sections 86 thereof is kept relatively low.

In accordance with the present invention counterweight 26 is adjusted longitudinally of the rear end of the tone arm 22 until the tone arm is exactly balanced on its horizontal pivotal axis HP—HP after which tension is exerted on the tone arm so as to introduce a desired amount of stylus pressure during record play. This obtains through use of a tension spring 98, the geometry of which in relation to the bending moment of pivotal support of the tone arm is such that it introduces a given value of force on the stylus tracking in the groove of a record which force remains essentially constant whether the stylus is tracking the groove of a single record located on the turntable or is tracking the groove of a top one of several records placed on the turntable.

Thus referring to FIGURES 3 and 4 tension spring 98 is shown as crossing axis HP—HP such that its force is directed parallel to the plane in which the stylus is capable of moving vertically and also intersecting vertical axis VP—VP. The rear end of said spring 98 is anchored at 101 to a depending lug 100 carried by the rear end of the tone arm cradle 74 which point of connection is located behind pivotal axis HP—HP and also spaced below the tone arm a distance less than the distance the tone arm is spaced over said axis HP—HP so that in the balanced condition of the tone arm it lies above a horizontal plane including pivot axis HP—HP. The other or forward end of said tension spring 98 is anchored to a portion 102 of a vertically slidable rack 104. As shown best in FIGURE 3 rack 104 is supported for vertical movement by its proposed longitudinal edges sliding in provided guideways 105 of spaced brackets 106 which also serve as bearings for the shaft 110 of a pinion 112, the teeth of said pinion having meshing engagement with the teeth of rack 104. Affixed to one end of shaft 110 is the aforementioned knob 28 such that with rotation of said knob, pinion 112 will be caused to move rack 104 vertically in its guideways so that the end of the tension spring 98 anchored at 102 is raised and lowered for reasons hereinafter made clear.

Referring therefore to FIGURES 1 and 3 it will be appreciated that with vertical movement of the tone arm about axis HP—HP defined by the intermediate section 86 of coiled wire suspension members 80 anchor point 102 remains fixed but that anchor point 101 changes its spacing from axis HP—HP wherefore the amount and direction of the force generated in spring 98 changes; however it remains in a plane parallel to the plane through which the stylus 25 of the tone arm moves and is therefore constantly reacting against the bending moment of the coiled wire sections 86 with pivoting thereon of the tone arm.

As shown by full lines in FIGURE 4, with point 102 of the rack resting on the top of bracket 106, the forward end of the tension spring 98 is at its lowest point. In this position spring 98 intersects pivotal axis HP—HP as it goes downward from point 101 to point 102 somewhat below the horizontal plane HP—HP. In this position it exerts no force on the tone arm beyond that required to counteract the bending moment of wire coil sections 86 of the suspension springs 80 as the stylus moves between a height where it engages the highest one of the stack of records to the lowest one thereof or the first record mounted on the turntable, assuming the tone arm to be balanced by counterweight 26. The stylus therefore exerts no force on the record.

Advantageously a height is selected for said intermediately axial deflectable sections 86 of the coiled wire suspension members relative to the turntable such that the mid point thereof between hanger extension 68 and portions 78 which is considered to define the effective pivotal axis HP—HP of the tone arm also lie at a compromise height approximately midway of the height of the expected maximum number of records to be loaded onto the turntable for playing by stylus 25 of the tone arm. Of consequence whether the stylus engages within the groove of a single record placed on the turntable or the top one of said maximum number, it still continues to exert substantially the same or zero force on the record. This obtains because as the spacing of the rear anchored end of the tension spring 98 at 101 changes, the change in torque is at a ratio such that the new torque generated thereby approximately compensates for the increased flexing moment or resisting torque of the suspension pivot means 86 and also compensates for the change in length of the tension spring 98 generating said torque.

However it is desirable for good fidelity that the stylus exert some force on the groove, although the force should not change with change in record height to any substantial extent. Stylus pressure is obtained by raising the forward anchored end 102 of the tension spring 98 from its low position to some height thereabove which is sufficient to lengthen and thereby to change the tension of the spring 98 and so introduce a predictable change in the pressure of the stylus which it exerts on the record during play. Again, by reason of the described geometrical relationship that exists between the tension spring 98, the coil wire sections 86 of the suspension hangers 80 and the balanced condition of the tone arm obtained by means of the counterweight 26 this stylus pressure obtained by relocation of anchor point 102 remains constant whether the stylus is tracking in the groove of the first record on the turntable or on the top one of several records placed on the turntable.

Referring to FIGURE 8 it will be understood that although for example zero force is required to be exerted by the stylus on the records whether it be the first or top one of several records on the table a bending moment of force is applied to the coil wire sections 80 about their axis HP—HP in order to pivot the tone arm and which will vary whether the tone arm is lowered to engage a single record on the turntable or is lowered to a record higher in the stack. To minimize the distance to which the stylus must move about its pivot HP—HP to engage on all the records of a stack and thereby the resistive torque of the coil wire sections 86 the effective pivot axis HP—HP of the tone arm is located in a horizontal plane representing the midpoint of the record stack as noted above. Adjustable anchor point 102 is then located at a height above said plane which will cause the tension spring to introduce the required stylus pressure on the record at said midpoint in the stack. Anchor point 101 is not changed, although it is understood that the same moves with the tone arm so that its spacing changes with relation to axis HP—HP with the different record heights at which the stylus 25 is located.

Assuming a full complement of records stacked on the turntable comprises six in number which is equivalent to about .6 inch in height then to move the stylus from its set position at top of the record stack to the first record on the turntable would require a maximum movement of the stylus of about .5 inch. In the laboratory, experiments were conducted with a tone arm construction as described where the exposed or unconfined section 86 of the suspension hanger coils 80 is .1 inch in height and has a bending moment equivalent to .010 inch in diameter of a single strand of piano wire as exampled above and tension spring 98 is mounted on 2 inch center points (distance separating anchors 101 and 102) with a tension load of 158.5 grams and a spring rate of 200 grams per inch, the stylus swinging about its effective pivot HP—HP on a radius equal to 8.759 inches. In said experiments, it was found that if anchor point 102 is spaced .055 inch below the horizontal plane including pivot axis HP—HP and anchor point 101 spaced .055 above, with the tone arm in balanced condition, the spring 98 will then create a sufficient amount of force in opposition to the bending moment or resistive torque of the coil wire sections 86 so that the stylus pressure will remain zero over the record stack height. Moreover, if anchor point 102 is thereafter moved vertically to .055 inch over said plane, tension spring 98 will thereafter introduce a stylus pressure of one gram over the record stack height, when anchor point 102 is raised to a height of .164 inch over said plane the stylus will exert a pressure of 2 grams, when anchor point 102 is raised to a height of .273 inch the stylus will exert a pressure of 3 grams, when the anchor point 102 is raised to a height of .382 inch the stylus will exert a pressure of 4 grams and when the anchor point 102 is raised to a height of .491 inch over said plane then the stylus will exert a pressure of 5 grams. This has been ascertained not only in the laboratory by tests but also confirmed mathematically using the following formulae to solve for stylus pressure S$p$:

$$f_1 d_1 = D \cdot Sp$$

$$f_2 d_2 = D \cdot Sp + Mf$$

or $$f_1 d_1 = f_2 d_2 - Mf$$

Where $f_1$ represents the force of spring 98 when the stylus has been moved through its arcuate path about pivot HP—HP to bear on the top record of the stack on the turntable and so having a length $L_1$ (FIGURE 8) which is therefore longer than length L for which the height of anchor point 102 has been adjusted to introduce a specific force $f$ in spring 98; $f_2$ representing the force for a length $L_2$ of the spring 98 which results when the stylus moves through its longer path to engage on the first record stack on the turntable;

Where $d_1$ and $d_2$ represent the spacing of the force axis of the tension spring over the effective pivot when the stylus is engaging on the top and on the bottom record of the stack respectively;

S$p$ represents the stylus pressure;

M$f$ represents the moment of pivot flex $\Delta Sp \cdot D$ (obtained by tests as .5 gram); and D is the radius on which the stylus swings about pivot HP—HP (in the laboratory test determined as 8.759 inches). From the above facts the values of $f_1$, $f_2$ and $d_1$ and $d_2$ may be mathematically ascertained and after which the formula is solved for S$p$. In the following table the values of the stylus pressure on the top record, on the middle record and on the bottom record were calculated for different heights of anchor 102.

STYLUS PRESSURE

| Height of anchor 102 (inches) | On top record (grams) | On bottom record (grams) |
|---|---|---|
| −.055 | 0.0 | 0.0 |
| .055 | 1.0 | 1.0 |
| .164 | 2.0 | 2.007 |
| .273 | 3.0 | 3.005 |

This is also graphically illustrated by FIGURE 8 wherein it is apparent that when there is but one record on the turntable the rear end of the spring 98 moves upwardly on an arc defined by the horizontal pivot axis and tends to shorten the spring length $L_2$ slightly and so reduces its force $f_2$. At the same time the raising of the rear end of the spring at 101 increases the moment of arm $d_2$ sufficiently to also overcome the bending resistance of spring 86 so that the resultant moment about the pivot axis remains the same and still produces the selected stylus pressure. When the maximum number of records are on the turntable, the rear end of the spring 98 anchored at 101 has moved through a shorter arcuate path about the tone arm pivotal axis HP—HP wherefore spring 98 is stretched somewhat more and produces a force $f_1$. However, in this latter instance, the moment of arm $d_1$ is also shorter and thus again the moment about the pivot axis remains virtually constant and the stylus pressure is that for which it is set by knob 28 as explained above.

For the aesthetic effect which it creates, the two sides of the tone arm mount 20 are preferably enclosed by two removably located half covers 200 which are generally rectangular in shape, and so located as to leave an operating space therebetween to accommodate the described vertical movement of the tone arm. In their assembly the bottom edges of said half covers are seated in locating slots 204 provided in the base plate 34 of the tone arm mount 20 (FIGURE 3) and are resiliently secured to the tone arm mount as by strategically located spring clips 202.

The above described arrangement of the improved tone arm assembly produce numerous important advantages. The vertical flexible members or coil wire spring sections 80 which suspend the tone arm from moving about its horizontal pivot axis HP—HP do so in a way such that the only frictional resistance to such pivotal movement is the inner molecular structure of the springs themselves and which may be considered virtually negligible. Most phonograph records are somewhat warped and during the playing of a record the stylus supporting end of the tone arm is required to move upwardly and downwardly as the record rotates. Where there is appreciable frictional resistance to such movement, substantial variations in stylus pressure can be expected. However, with the present invention the stylus pressure remains constant as the outer end of the tone arm moves up and down, thereby eliminating tracking distortion attributable to needle pressure variation. It will be further noted that only a relatively small force must be developed by tension spring 98 in order to produce the required stylus pressure. The tone arm is initially balanced by counterweight 26, whereas in prior art tone arm assemblies possessing no counterweight a spring is required to counterbalance the entire weight of the tone arm and also simultaneously induce the desired stylus pressure. Moreover the use of conical bearings 48 and 63 on which to swing the tone arm about the vertical axis VP—VP further reduce the frictional resistance of the stylus movement in tracking the groove of the records. Because there is no or only minimum frictional resistance to the movement of the tone arm about its vertical pivot axis VP—VP, the tone arm can be pulled inwardly during playing a record by a substantially reduced force and this permits use of a relatively small stylus pressure.

While I have illustrated my invention in a preferred form, I do not intend to be limited to that form, except insofar as the appended claims are so limited, since modifications coming within the scope of my invention will be readily suggested to others with my disclosure before them.

I claim:

1. In a record player having a turntable for rotatably supporting a record for play, the combination of a tone arm having a stylus at its forward end for playing the record and a tone arm support swingable through a plane parallel to a plane in which the turntable rotates, said tone arm having a portion thereof remote from its stylus suspended on said support by means of a pair of spaced coil springs transversely disposed to said parallel planes and connected between said tone arm and support which accommodate swinging of said tone arm toward and away from the turntable about an intermediate section of said coil springs by axial deflection thereof, and means acting in opposition to the axial deflection of said coil springs which regulate the pressure of the stylus on a record supported by the player turntable for play.

2. The combination of claim 1 wherein said means includes a counterbalance member carried by the tone arm adjacent its other end and behind the suspension thereof on the tone arm mount.

3. The combination of claim 1 wherein the coil springs define a horizontal axis about which the tone arm moves vertically, and said means includes a tension spring connected between the tone arm and its mount and which extends across said horizontal axis and generates a torque substantially compensating for the flexing moment of the coil springs and change in length of the tension spring with vertical movement of the tone arm.

4. The combination of claim 3 wherein said tension spring intersects said horizontal axis at right angles and generates no moment when the tone arm is in balance.

5. The combination of claim 4 wherein one of the ends of the tension spring is adjustable to change the tension of the spring and thereby the pressure exerted by the tone arm stylus in record play.

6. The combination of claim 5 wherein the end of the tension spring connected to the tone arm mount is vertically adjustable.

7. In a phonograph tone arm assembly, the combination of a tone arm having one end adapted for mounting a stylus thereto, a mount for said tone arm including a pair of spaced uprights, the tone arm having a portion thereof remote from its said one end provided with spaced depending portions underlying portions of said uprights, and vertically extending sections of coil wire having their upper end portions longitudinally secured to said portions of the uprights and having their lower end portions longitudinally secured to said depending portions, the intermediate portion of said coil springs being axially deflectable to define therebetween a pivotal axis about which said tone arm is vertically movable.

8. The combination of claim 7 further including means acting in opposition to the axial deflectivity of the coil wire sections in order to limit the pressure of a stylus when mounted on the one end of the tone arm and utilized in a phonograph to play a record rotatably turning with the turntable thereof.

9. The combination of claim 7 further including dampening sections of flexible material extended through the coil wire sections.

10. The combination of claim 7 wherein the tone arm also supports a counterweight on its other end, the counterweight being adjustable on said other end longitudinally of the tone arm toward and away from its provided depending portions, the center of gravity of said counterweight being spaced behind and below the connections of said depending portions with the coil wire sections.

11. The combination of claim 7 wherein the coil springs are wound such that their axial bending moment is equivalent to a single strand of much smaller diametered wire.

12. In a tone arm assembly for use with a record player having a turntable for supporting one and more than one record for play, the combination of a tone arm having its forward end adapted for carrying a stylus for tracking in the groove of the top record on the turntable of such a record player, a mount, and hinge means by which said tone arm is supported on said mount for vertical movement about a horizontal axis, said hinge means introducing a force resisting said vertical movement which changes in value as the tone arm is raised to cause the stylus to engage a record at different heights on the turntable, and adjustable tensioning means comprising a spring extending across said axis which causes the stylus to exert a pressure on a record when tracking in the groove thereof, said tensioning means being connected between a fixed point on the tone arm above and behind said horizontal axis and a point on the tone arm mount in front of said horizontal axis such that said tensioning means provides a force of changing moment directed along an axis disposed parallel to the vertical plane through which the stylus is carried by the tone arm with said vertical movement thereof, said change in force being such as to substantially compensate for the change in reactive force of the hinge means and changing length of the spring at said different heights at which the stylus engages a record on the turntable, the stylus thereby continuing to exert substantially the same pressure at said different heights of records positioned on the turntable, and said connection point of the tensioning means on the tone arm mount being vertically adjustable to change said pressure exerted by the stylus on a record at said different heights.

13. In a tone arm assembly for use with a record player having a turntable on which one and more than one record is played, the combination of a tone arm carrying a stylus at its forward end, and a mount therefor, said mount supporting depending coil spring means from the lower end of which said tone arm has a portion thereof remote from its forward end suspended, said coil spring means being axially deflectible between its connection to said mount and support by the tone arm to define an axis about which the tone arm is pivotable in order to locate its stylus carrying forward end at different heights of a record on the player turntable, and tensioning means comprising a spring having its forward end connected to the mount forwardly of said axis and its rear end connected to the tone arm above and behind said pivotal axis and tensioned to introduce a force parallel to the plane through which the stylus moves with pivoting of the tone arm about said pivotal axis so that the tone arm stylus exerts a pressure on a record on the turntable, said coil spring means exerting a bending force in resistance to the pivoting of the tone arm, and the end of the spring on the tone arm changing its position as the tone arm is pivoted to relocate the stylus to different record heights so as to generate a torque change in opposition to the resisting torque of the coil spring means and changing length of the spring at different angles to which the tone arm is pivoted to accommodate said different record heights such that the pressure of the stylus remains substantially constant at said different record heights, and adjustment means for changing the angle and moment of said force in order to change the value of the record engaging pressure exerted by the stylus.

14. The combination of claim 13 wherein the tone arm mount is itself adapted to turn on a pivot the axis of which intersects the pivotal axis of the tone arm at right angles thereo and also intersects the force of the tensioning means.

15. The combination of claim 13 wherein the tensioning means comprises a resiliently extensible coil spring having one end connected to the tone arm and its other end connected to the tone arm mount, one of said connections being in front of the pivotal axis defined by the resilient suspension means and the other connection being behind said pivotal axis.

16. The combination of claim 15 wherein the connection of the one end of said spring to the tone arm mount is adjustable linearly in a plane parallel to the plane in which the stylus moves with pivoting of the tone arm to change the value of the record engaging pressure exerted by the stylus.

17. The combination of claim 15 wherein the resiliently extensible coil spring substantially intersects the pivotal axis of the tone arm and at right angles thereto when the tone arm is in balance with no stylus pressure, and the connection of the resiliently extensible coil spring to the tone arm mount being adjustable in a direction normal to the pivotal axis.

18. The combination of claim 14 further including an adjustable counterweight on the tone arm mounted behind the pivotal axis.

19. The combination of claim 18 wherein the center gravity of the counterweight is located generally rearwardly of the pivotal axis on which the tone arm moves about its suspension to the tone arm mount and also generally below said axis.

20. The combination of claim 18 wherein the counterweight comprises a guide member slidably keyed to the tone arm and containing drive means for effecting movement of the guide member along the tone arm, said counterweight including a second weighted member detachably connected to said guide member in depending relation thereto.

References Cited

UNITED STATES PATENTS

| | | | |
|---|---|---|---|
| 1,866,403 | 7/1932 | Elmer | 274—23 |
| 2,996,295 | 8/1961 | Smith | 267—1 |
| 3,093,379 | 6/1963 | Fabel et al. | 274—23 |
| 3,174,755 | 3/1965 | Taraborreli | 274—23 |
| 3,227,459 | 1/1966 | Haines | 274—23 |

FOREIGN PATENTS

| | | |
|---|---|---|
| 1,007,074 | 4/1957 | Germany. |
| 759,394 | 10/1956 | Great Britain. |

HARRY N. HAROIAN, *Primary Examiner.*